(12) United States Patent
Sans

(10) Patent No.: US 11,491,982 B2
(45) Date of Patent: Nov. 8, 2022

(54) METHOD FOR CONTROLLING THE POWERTRAIN OF A MOTOR VEHICLE

(71) Applicant: VITESCO TECHNOLOGIES GMBH, Hanover (DE)

(72) Inventor: Mariano Sans, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/291,798

(22) PCT Filed: Nov. 8, 2019

(86) PCT No.: PCT/EP2019/080734
§ 371 (c)(1),
(2) Date: May 6, 2021

(87) PCT Pub. No.: WO2020/094860
PCT Pub. Date: May 14, 2020

(65) Prior Publication Data
US 2021/0387626 A1    Dec. 16, 2021

(30) Foreign Application Priority Data

Nov. 8, 2018  (FR) ........................................ 1860274

(51) Int. Cl.
*B60W 30/18*    (2012.01)
*B60W 10/184*   (2012.01)
*B60W 40/10*    (2012.01)

(52) U.S. Cl.
CPC .... *B60W 30/18072* (2013.01); *B60W 10/184* (2013.01); *B60W 30/18109* (2013.01);
(Continued)

(58) Field of Classification Search
CPC ......... B60W 10/184; B60W 30/18072; B60W 30/18109; B60W 40/1005;
(Continued)

(56) References Cited

U.S. PATENT DOCUMENTS

| 2011/0313647 | A1  | 12/2011 | Koebler et al. |
| 2015/0046034 | A1* | 2/2015  | Kikuchi ............... B60G 17/018 |
|              |     |         | 701/37 |

(Continued)

FOREIGN PATENT DOCUMENTS

| EP | 2 703 209   | 3/2014  |
| FR | 3 055 996   | 3/2018  |
| WO | 2014/158846 | 10/2014 |

OTHER PUBLICATIONS

International Search Report and Written Opinion of the ISA for PCT/EP2019/080734, dated Jan. 13, 2020, 14 pages.
(Continued)

*Primary Examiner* — Edwin A Young
(74) *Attorney, Agent, or Firm* — Nixon & Vanderhye

(57) ABSTRACT

Disclosed is a method for controlling the powertrain of a motor vehicle between the current location of the vehicle and an arrival point, including calculating a theoretical optimal traction force, determining a friction force applied to the vehicle, calculating an actual optimal force to be applied to the wheels as far as the arrival point, and applying a traction force to the wheels of the vehicle when the calculated actual optimal force is strictly greater than a predetermined threshold value or else not applying a force to the wheels of the vehicle when the calculated actual optimal force is greater than or equal to zero and less than or equal to the predetermined threshold value, or else applying a braking force to the wheels of the vehicle when the calculated actual optimal force is strictly less than zero.

20 Claims, 1 Drawing Sheet

(52) U.S. Cl.
CPC ..... *B60W 40/1005* (2013.01); *B60W 2530/16* (2013.01); *B60W 2556/50* (2020.02); *B60W 2710/18* (2013.01); *B60W 2720/106* (2013.01); *B60W 2720/30* (2013.01)

(58) Field of Classification Search
CPC ......... B60W 2530/16; B60W 2556/50; B60W 2710/18; B60W 2720/106; B60W 2720/30
See application file for complete search history.

(56) References Cited

U.S. PATENT DOCUMENTS

2016/0311423 A1* 10/2016 Storm ................... B60L 7/08
2018/0120841 A1   5/2018 Endo et al.

OTHER PUBLICATIONS

Sciarretta et al., "Optimal Control of Parallel Hybrid Electric Vehicles", IEEE Transactions on Control Systems Technology, vol. 12, No. 3, May 2004.
Maamria et al., "On the impact of model simplification in input constrained optimal control: application to HEV energy-thermal management", 53rd IEEE Conference on Decision and Control, Dec. 15-17, 2014, 7 pages.

* cited by examiner

METHOD FOR CONTROLLING THE POWERTRAIN OF A MOTOR VEHICLE

This application is the U.S. national phase of International Application No. PCT/EP2019/080734 filed 8 Nov. 2019, which designated the U.S. and claims priority to FR Patent Application No. 1860274 filed 8 Nov. 2018, the entire contents of each of which are hereby incorporated by reference.

BACKGROUND OF THE INVENTION

Field of the Invention

The invention relates to optimizing the energy consumption of a motor vehicle and more particularly to a method for controlling the powertrain of a motor vehicle so as to optimize the energy consumption needed for causing said vehicle to move.

Description of the Related Art

In a motor vehicle, it is known practice to optimize the energy consumption of the powertrain. Such optimization may be performed in relation to the fuel, in relation to the electrical energy, or in relation to both at once.

In the known manner, optimization can be performed using the principle known by the name of Pontryagin's maximum principle (PMP). This method consists in minimizing the Hamiltonian function (or Hamiltonian) of a parameter of the vehicle, for example its speed or the journey time.

However, when this principle is applied to the force applied to the wheels of the vehicle while taking account of a realistic physical model notably including all the effects that resist forward progress, such as the air friction, which is dependent on the speed and on the square of the speed, the solution of such an equation has no direct analytical solution which means that it is not possible to obtain a direct equation for the optimal consumption of the vehicle from the force applied to the wheels, and this constitutes a major drawback. There is therefore a need for an effective solution that makes it possible to overcome at least in part this drawback.

SUMMARY OF THE INVENTION

To this end, a very first subject of the invention is a method for controlling the powertrain of a motor vehicle between the current location of said vehicle and an arrival point, said method comprising the steps of:
- calculating a theoretical optimal traction force to be applied to the wheels of the vehicle in the absence of friction in order to allow the vehicle to run along a predetermined path that conducts the vehicle from its current point as far as the arrival point, said theoretical optimal traction force optimizing at least one parameter concerned with the movement of the vehicle,
- determining a friction force applied to the vehicle from the speed of the vehicle at the current location of the vehicle,
- calculating the actual optimal force to be applied to the wheels in order to allow the vehicle to run along the predetermined path from the calculated theoretical optimal traction force and from the determined friction force,
- applying a traction force to the wheels of the vehicle when the calculated actual optimal force is strictly greater than a predetermined threshold value or else not applying a force to the wheels of the vehicle when the calculated actual optimal force is greater than or equal to zero and less than or equal to the predetermined threshold value, or else applying a braking force to the wheels of the vehicle when the calculated actual optimal force is strictly less than zero.

The method according to the invention allows the energy consumption of the vehicle to be optimized quickly and effectively. The method notably allows the actual optimal force to be calculated using a direct solution employing simple calculations of a theoretical optimal traction force and of a friction force, and then by acting according to whether or not this actual optimal force is greater than a predetermined threshold value and whether it is positive or negative. The optimization of the energy consumption of the vehicle is therefore easy and reliable, making the vehicle more efficient. The case in which force is not applied to the wheels of the vehicle when the calculated actual optimal force is greater than or equal to zero and less than or equal to the predetermined threshold value relates essentially to combustion-engine traction, as a combustion engine is unable to produce "useful" torque that is less than the internal friction torque, because otherwise the engine may stall.

As a preference, the predetermined threshold value is calculated as a function of the state of operation of the powertrain of the vehicle, for example in real time, before commanding the powertrain. This threshold value may also be determined at the factory beforehand and recorded in a memory zone of a computer implementing the method according to the invention.

According to one aspect of the invention, the method comprises a preliminary step of determining the path that allows the vehicle to proceed from its current point as far as the arrival point. The path may be determined before the vehicle begins to run, for example when the arrival point is determined by inputting the destination on an on-board display, or else at any moment in real time between the current point of the vehicle (namely the spot at which the vehicle is located) and the arrival point predicted by a predictive navigation system.

Advantageously, the at least one parameter concerned with the movement of the vehicle that is to be optimized is the speed of the vehicle and/or the journey time.

The invention also relates to a computer for commanding the powertrain of a motor vehicle between the current location of said vehicle and an arrival point, said computer being configured to:
- calculate a theoretical optimal traction force to be applied to the wheels of the vehicle in the absence of friction in order to allow the vehicle to run along a predetermined path that conducts the vehicle from its current point as far as the arrival point, said theoretical optimal traction force optimizing at least one parameter concerned with the movement of the vehicle,
- determine a friction force applied to the vehicle from the speed of the vehicle at the current location of the vehicle,
- calculate an actual optimal force to be applied to the wheels in order to allow the vehicle to run along the predetermined path from the calculated theoretical optimal traction force and from the determined friction force,
- command the powertrain in order to apply a traction force to the wheels of the vehicle when the calculated actual optimal force is strictly greater than a predetermined threshold value, or else not apply any force to the wheels of the vehicle when the calculated actual optimal force is greater than or equal to zero and less than or equal to the predetermined threshold value and command the powertrain in order to apply a braking force to the wheels of the vehicle when the calculated actual optimal force is strictly less than zero.

Advantageously, the computer is configured to determine the predetermined threshold value, in real time, as a function of the state of operation of the powertrain of the vehicle or else beforehand at the factory.

According to one aspect of the invention, the computer is configured to determine a path that allows the vehicle to proceed from its current point as far as the arrival point. The computer may be configured to determine the path before the vehicle begins to run, for example when the arrival point is determined by inputting the destination on an on-board display, or else at any moment in real time between the current point of the vehicle (namely the spot at which the vehicle is located) and the arrival point predicted by a predictive navigation system.

Advantageously, the at least one parameter concerned with the movement of the vehicle that is to be optimized is the speed of the vehicle and/or the journey time.

The invention also relates to a vehicle, notably a motor vehicle, comprising wheels, a powertrain for said plurality of wheels and a computer, as set out hereinabove, for controlling said powertrain.

BRIEF DESCRIPTION OF THE DRAWINGS

Other features and advantages of the invention will become apparent from the following description, given with reference to the appended figures, which are given by way of non-limiting examples and in which identical references are given to similar objects.

DESCRIPTION OF THE PREFERRED EMBODIMENTS

Figure 1:
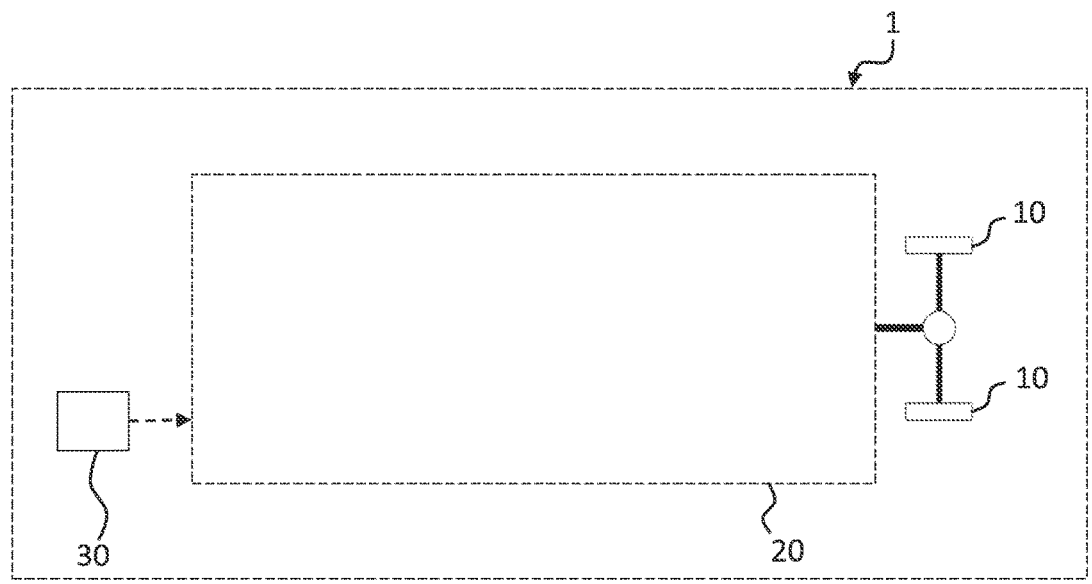
FIG. 1 schematically illustrates one embodiment of the vehicle according to the invention.
Figure 2:
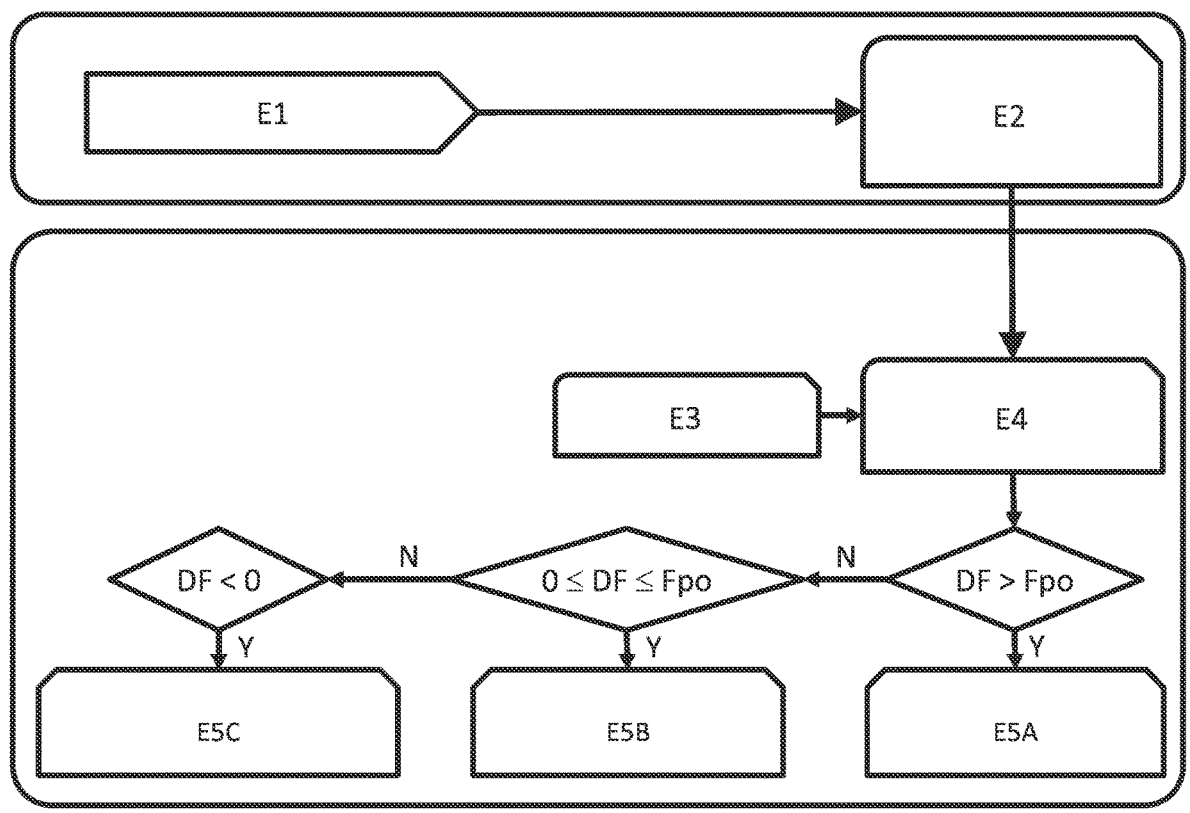
FIG. 2 illustrates an embodiment of the method according to the invention.

FIG. 1 depicts one embodiment of the vehicle 1 according to the invention. In this example, the vehicle 1 is a hybrid motor vehicle, although this is not in any way limiting of the scope of the present invention. Specifically, the invention is aimed at any type of motor vehicle and any type of motor/engine, notably a vehicle with a combustion engine, or an electric or hybrid vehicle.

The vehicle 1 comprises wheels 10, a powertrain 20 for driving said wheels 10 and a computer 30 notably providing control of said powertrain 20 between a departure point, representing the current location of the vehicle 1, and an arrival point. The powertrain 20 may be of the combustion-engine, electric or hybrid type and comprises at least one motor/engine (not depicted) for driving the wheels 10 of the vehicle 1.

The computer 30 is configured to determine an arrival point of the vehicle 1, delineating a path from its current position, namely from the spot at which said vehicle 1 is located. For example, the arrival point may be provided by the driver of the vehicle 1 and the path may be selected via or by a positioning module, for example of GPS type, carried on board the vehicle 1.

The computer 30 is configured to calculate the traction force referred to as "theoretical optimal" traction force Fw to be applied to the wheels 10 in the absence of friction, so as to allow the vehicle 1 to run as far as the arrival point, said theoretical optimal traction force Fw optimizing at least one parameter of the vehicle 1 such as, for example, the optimal speed v to be adopted in order to reach the arrival point, or else the optimal time needed to arrive at the determined arrival point. In the present application, "optimal" is meant in terms of energy consumption (notably fuel and/or electrical energy) for conducting the vehicle 1 to the arrival point.

The computer 30 is configured to determine the friction force Fr applied to the vehicle 1 from the speed v of the vehicle 1 at the current location of the vehicle 1.

The computer 30 is configured to calculate the actual optimal force DF to be applied to the wheels 10 in order to allow the vehicle 1 to run as far as the arrival point, from the calculated theoretical optimal traction force Fw and from the determined friction force Fr.

The computer 30 is configured to command the application of a traction force Fu to the wheels 10 of the vehicle 1 when the calculated actual optimal force DF is strictly greater than a predetermined threshold value Fpo, to not apply a traction force Fu to the wheels 10 of the vehicle 1 when the calculated actual optimal force DF is greater than or equal to zero and less than or equal to the predetermined threshold value Fpo, and to apply a braking force Fb to the wheels 10 of the vehicle 1 when the calculated actual optimal force DF is strictly less than zero.

The predetermined threshold value Fpo is preferably calculated as a function of the state of operation of the powertrain 20 of the vehicle 1, for example in real time. This threshold value Fpo may also be determined at the factory beforehand and recorded in a memory zone of a computer 30 implementing the method according to the invention.

One example of a method according to the invention and the implementation thereof will now be described.

In a preliminary step E0, the computer 30 determines the threshold value Fpo in real-time or has this threshold value Fpo available to it in a memory zone when it has been determined at the factory.

In a step E1, the computer 30 determines the path to be followed between the current point (i.e. where the vehicle 1 is situated) and a predefined arrival point, for example provided by the driver beforehand or detected by the vehicle 1.

Next, in a step E2, the computer 30 calculates the so-called "theoretical optimal" traction force Fw to be applied to the wheels 10 in the absence of friction in order to allow the vehicle 1 to cover the determined path. This theoretical optimal traction force Fw optimizing for example the speed v that the vehicle 1 is to adhere to on the journey as far as the arrival point, or the journey time as far as the arrival point. As a preference, the computer 30 calculates the minimum energy necessary to move the vehicle from its current point (or current location) as far as the predetermined arrival point, using a method known to those skilled in the art and which can be solved, for example based on the Pontryagin's maximum principle (PMP) known per se, assuming the system to be free of friction. This makes it possible to obtain a curve of the theoretical optimal torque (or force) Fw to be applied to the wheels 10 in the absence of friction, according to the predetermined path. In particular, if there is a desire to minimize the sum of the square of the forces of the wheels 10, what is generally obtained is an optimal function of the type $Fw(t)=u_0+u_1 \cdot t$, which is a linear function of time t, and amounts to an order-2 polynomial for the speed profile as a function of time t.

In a step E3, the computer 30 determines the friction force Fr applied at that time to the vehicle 1 from the speed v of the vehicle 1 at the current location of the vehicle 1. As a preference, the computer 30 considers the resistive torque (or the resistive force) experienced by the wheels 10 due to various friction causes (rolling friction, viscous friction, aerodynamic friction) known from the deceleration (or "coasting") equation in the form of an order-2 polynomial as a function of speed and caused by the gradient of the road according to the current position. These friction forces are therefore written in the form:

$Fr = -(F_0 + F_1 \cdot v + F_2 \cdot v^2) - M g \sine(\alpha)$ where $\alpha$ is the gradient of the road at the point at which the vehicle 1 is situated and v is the speed of the vehicle 1.

Next, in a step E4, the computer 30 calculates the actual optimal force DF to be applied to the wheels 10 in order to allow the vehicle 1 to run as far as the arrival point, from the theoretical optimal traction force Fw calculated in step E2 and from the friction force Fr determined in step E3. As a preference, the computer 30 calculates, at each moment, the difference or "compensated value" (a value that is positive or negative) between the overall torque (or force) to be applied to the wheels 10, which corresponds to the theoretical optimal traction force Fw, and the total resistive torque Fr as a function of the actual speed v of the vehicle 1, using the following formula: DF=Fw−Fr.

The value of this actual optimal force DF corresponds to the theoretical optimal traction force Fw to be applied to the wheels 10 compensated by the force on-board through the transmission, whatever the type of traction used by the vehicle 1: combustion engine, electric motor or hybrid.

In a step E5A, the computer 30 commands the powertrain 20 of the vehicle 1 in order that said powertrain 20 applies a traction force Fu to the wheels 10 when the calculated actual optimal force DF is strictly greater than a predetermined threshold value Fpo, or else does not command the powertrain 20 so that no force is applied to the wheels 10 of the vehicle 1 when the calculated actual optimal force DF is greater than or equal to zero and less than or equal to the predetermined threshold value Fpo (step E5B), or else commands the powertrain 20 of the vehicle 1 so that said powertrain 20 applies a resistive force Fr to the wheels 10 of the vehicle 1 when the calculated actual optimal force DF is strictly less than zero (step E5C).

More specifically, if the actual optimal force DF to be applied to the wheels 10 is positive (driving phase) and greater than a certain threshold value Fpo corresponding to the motor/engine losses, then it corresponds to the torque (or force) that the motor/engine(s) of the powertrain 20 of the vehicle 1 needs to supply, and in that case the motive force Fu to be applied is equal to the actual optimal force DF (i.e. the calculated actual optimal force DF is applied to the wheels 10):

$DF > Fpo \Rightarrow Fu(motive) = DF = Fw - Fr$ (positive value)

In that case, the computer 30 does not command the braking of the wheels 10, which means that the braking force Fb applied to the wheels 10 is zero.

If the actual optimal force DF to be applied to the wheels 10 is zero or positive but less than the motor/engine losses defined by the threshold value Fpo, then the computer 30 commands a phase of what is known to those skilled in the art as "coasting" for which the motive and breaking forces are zero:

$0 \leq DF \leq Fpo \Rightarrow Fu = 0$ and $Fb = 0$

The computer 30 then sends the driver a signal to advise him to lift off the accelerator in order to begin to decelerate.

It will be noted that the case in which force is not applied to the wheels 10 of the vehicle 1 when the calculated actual optimal force DF is greater than or equal to zero and less than or equal to the predetermined threshold value Fpo relates essentially to combustion-engine traction, as a combustion engine is unable to produce "useful" torque that is less than the internal friction torque, because otherwise the engine may stall.

If the actual optimal force DF to be applied to the wheels 10 is negative (braking phase) then it corresponds to the force that the braking system needs to apply:

$DF < 0 \Rightarrow Fb(braking) = Fw - Fr$ (negative value)

or else, as an absolute value: Fb (braking)=−(Fw−Fr).

If the vehicle 10 does not have a controllable braking system, then a signal is sent to the driver to inform him of the deceleration he needs to apply, using manual braking.

If the vehicle 10 is fitted with a controllable electric braking system having several levels n, of the multiple "retarder" type, then the deceleration equations are considered in the form of 2nd-order polynomials for speed for each braking level, and the demanded braking force Fb is compared against the various braking forces which are calculated as a function of the speed v, and made available by the multiple electrical system Fret(n), and the level n that is activated is the level that gives the closest value Fret(n) activated where the level n is chosen such that Fret(n) is as close as possible to Fb.

The parameters of the deceleration equations in the form of 2nd-order polynomials for speed for each braking level may originate from specific deceleration or "coasting" tests performed on a flat and straight track by applying each braking value of the retarder, this being something which differs from standard "coasting" tests which are done without the application of any force, either motive or braking, and under coasting only.

It will be noted that, as a preference, the "theoretical calculation" steps E1 and E2 may be performed just once for a predicted (or intended) journey, each time the journey is modified, but that the steps E3, E4 and E5 need to be performed at each moment (in real time) in order to adjust to the true state of friction due to the actual speed.

It will also be noted that the method described hereinabove can be improved to take account of the gradient of the road on which the vehicle 1 is traveling in real time. The real-time estimation of the gradient $\alpha$ of the road can be done as follows.

During the deceleration phases (known in the form of polynomials for speed), namely in a coasting phase or a phase in which electric braking is activated (in each instance with Fu≤0), the computer 30 calculates the optimal theoretical speed $v_{opti}$ (x) as a function of the forward progress of the vehicle 1 (i.e. as a function of its position x).

The speed $v_{opti}$ is calculated from the dynamic equation:

$$M \cdot \frac{dv_{opti}}{dt} = Fw_{opti}$$

It is then compared against the actual speed v, and from this there is deduced a discrepancy which is used to update the gradient of the road in a recursive estimation equation, using an adaptive gain coefficient $K_p$ (which for reasons of stability is positive):

$$\alpha_{n+1} = \alpha_n + K_p \cdot (v_{opti} - v_n) \text{ (where } K_p > 0\text{)}$$

If $\alpha > 0$, the gradient of the road is an upward slope, if $\alpha$ is of the order of 0, the road is substantially flat, and if $\alpha < 0$, the gradient of the road is a downward slope.

Thus, using this adaptation equation, if the observed speed $v_n$ is less (or respectively greater) than the expected speed $v_{opti}$, that indicates that the true gradient $\alpha$ is steeper (or respectively not as steep) as the previously-estimated value, such that this value $\alpha$ is corrected towards a higher (or respectively lower) value. If the speed discrepancy is zero, then the estimated gradient will not be modified.

Furthermore, driving referred to as "driving economically" (information provided to the driver) can be achieved as follows. During the motive phases, for which the force to be applied to the wheels 10 is positive: Fu>0, the computer 30 calculates the optimal theoretical speed $v_{opti}(x)$ as before as a function of the forward progress of the vehicle 1 (namely as a function of its position), compares it with the actual speed v of the vehicle 1 and from this deduces a discrepancy used to inform the driver:

if this discrepancy is negative ($v < v_{opti}(x)$), then no action is taken, if this discrepancy is positive ($v > v_{opti}(x)$), then the computer 30 commands the emitting of a signal which may adopt various possible forms: a visual signal on the dashboard of the vehicle 1 (pictogram, written message, etc.), an audible signal (beep, voice message, etc.) or a signal on a haptic pedal (vibration, or stronger return force, etc.) with a strategy that meters these messages according to the magnitude of the discrepancy, the duration of the discrepancy, the accumulated number of discrepancies, etc.

In one particular embodiment of the invention, the calculation of the optimal speed $v_{opti}(x)$ may be applied directly as a setpoint value to any on-board speed regulating system, under semi-manual or automatic control, particularly in self-driving vehicles 1.

The invention therefore makes it possible to optimize the energy consumption of the vehicle 1 in a way that is simple, reliable and effective. The invention notably makes it possible to address the question of how to optimize the speed profile of a vehicle 1 following a path while taking into account all the non-linear effects resisting forward progress that make finding a direct solution for energy optimization impossible, by calculating an overall optimal solution that is linear if the system is assumed to be without friction, and then compensating for the resistive forces afterwards, by representing these resistive forces by their speed-polynomial coefficients.

The invention claimed is:

1. A method for controlling a powertrain (20) of a motor vehicle between a current location of said vehicle (1) and an arrival point, said method comprising:

calculating (E2) a theoretical optimal traction force (Fw) to be applied to wheels (10) of the vehicle (1) in the absence of friction in order to allow the vehicle (1) to run along a predetermined path that conducts the vehicle (1) from a current point as far as the arrival point, said theoretical optimal traction force (Fw) optimizing at least one parameter concerned with the movement of the vehicle (1);

determining (E3) a friction force (Fr) applied to the vehicle (1) from a speed (v) of the vehicle (1) at the current location of the vehicle (1);

calculating (E4) an actual optimal force (DF) to be applied to the wheels (10) in order to allow the vehicle (1) to run along the predetermined path from the calculated theoretical optimal traction force (Fw) and from the determined friction force (Fr); and applying (E5A) a traction force (Fu) to the wheels (10) of the vehicle (1) when the calculated actual optimal force (DF) is strictly greater than a predetermined threshold value (Fpo) or else not applying (E5B) a force to the wheels (10) of the vehicle (1) when the calculated actual optimal force (DF) is greater than or equal to zero and less than or equal to the predetermined threshold value (Fpo) or else applying a braking force (Fb) to the wheels (10) of the vehicle (1) when the calculated actual optimal force (DF) is strictly less than zero.

2. The method as claimed in claim 1, said method further comprising a preliminary step of determining the predetermined threshold value (Fpo), in real time as a function of a state of operation of the powertrain (20) of the vehicle (1) or else beforehand at a factory.

3. The method as claimed in claim 2, said method further comprising a preliminary step of determining (E1) the path that allows the vehicle (1) to proceed from the current point as far as the arrival point.

4. The method as claimed in claim 2, wherein the at least one parameter concerned with the movement of the vehicle (1) that is to be optimized is the speed (v) of the vehicle (1).

5. The method as claimed in claim 2, wherein the at least one parameter concerned with the movement of the vehicle (1) that is to be optimized is a journey time.

6. The method as claimed in claim 1, said method further comprising a preliminary step of determining (E1) the path that allows the vehicle (1) to proceed from the current point as far as the arrival point.

7. The method as claimed in claim 6, wherein the at least one parameter concerned with the movement of the vehicle (1) that is to be optimized is the speed (v) of the vehicle (1).

8. The method as claimed in claim 6, wherein the at least one parameter concerned with the movement of the vehicle (1) that is to be optimized is a journey time.

9. The method as claimed in claim 1, wherein the at least one parameter concerned with the movement of the vehicle (1) that is to be optimized is the speed (v) of the vehicle (1).

10. The method as claimed in claim 9, wherein the at least one parameter concerned with the movement of the vehicle (1) that is to be optimized is a journey time.

11. The method as claimed in claim 1, wherein the at least one parameter concerned with the movement of the vehicle (1) that is to be optimized is a journey time.

12. A computer (30) for controlling a powertrain (20) of a motor vehicle (1) between a current location of said vehicle (1) and an arrival point, said computer (30) being configured to:

calculate a theoretical optimal traction force (Fw) to be applied to wheels (10) of the vehicle (1) in the absence of friction in order to allow the vehicle (1) to run along a predetermined path that conducts the vehicle (1) from a current point as far as the arrival point, said theoretical optimal traction force (Fw) optimizing at least one parameter concerned with the movement of the vehicle (1);

determine a friction force (Fr) applied to the vehicle (1) from a speed (v) of the vehicle (1) at the current location of the vehicle (1);

calculate an actual optimal force (DF) to be applied to the wheels (10) in order to allow the vehicle (1) to run along the predetermined path from the calculated theoretical optimal traction force (Fw) and from the determined friction force (Fr); and command the powertrain (20) in order to apply a traction force to the wheels (10) of the vehicle (1) when the calculated actual optimal force (DF) is strictly greater than a predetermined threshold value (Fpo) or else not apply any force to the wheels (10) of the vehicle (1) when the calculated actual optimal force (DF) is greater than or equal to zero and less than or equal to the predetermined threshold value (Fpo) and command the powertrain (20) in order to apply a braking force to the wheels (10) of the vehicle (1) when the calculated actual optimal force (DF) is strictly less than zero.

13. The computer (30) as claimed in claim 12, said computer (30) being further configured to determine the predetermined threshold value (Fpo), in real time as a function of a state of operation of the powertrain (20) of the vehicle (1) or else beforehand at a factory.

14. The computer (30) as claimed in claim 13, said computer (30) being further configured to determine a path that allows the vehicle (1) to proceed from the current point as far as the arrival point.

15. The computer (30) as claimed in claim 13, wherein the at least one parameter concerned with the movement of the vehicle (1) that is to be optimized is the speed (v) of the vehicle (1) and/or a journey time.

16. A vehicle (1) comprising wheels (10), a powertrain (20) for said wheels (10), and a computer (30) as claimed in claim 13 for controlling said powertrain (20).

17. The computer (30) as claimed in claim 12, said computer (30) being further configured to determine a path that allows the vehicle (1) to proceed from the current point as far as the arrival point.

18. The computer (30) as claimed in claim 17, wherein the at least one parameter concerned with the movement of the vehicle (1) that is to be optimized is the speed (v) of the vehicle (1) and/or a journey time.

19. The computer (30) as claimed in claim 12, wherein the at least one parameter concerned with the movement of the vehicle (1) that is to be optimized is the speed (v) of the vehicle (1) and/or a journey time.

20. A vehicle (1) comprising wheels (10), a powertrain (20) for said wheels (10), and a computer (30) as claimed in claim 12 for controlling said powertrain (20).

* * * * *